(No Model.) 7 Sheets—Sheet 2.

G. G. SCHROEDER.
TRACTION ENGINE.

No. 582,317. Patented May 11, 1897.

Witnesses:
J. B. McGirr.
W. J. June.

Inventor:
George G. Schroeder.
By Glover Chidly
Att'ys (No Model.)  G. G. SCHROEDER.  7 Sheets—Sheet 3.
TRACTION ENGINE.

No. 582,317.  Patented May 11, 1897.

Witnesses:  Inventor:
 George G. Schroeder.
 By  Attys.

(No Model.) 7 Sheets—Sheet 4.
G. G. SCHROEDER.
TRACTION ENGINE.

No. 582,317. Patented May 11, 1897.

Witnesses:
J. B. McGirr.
W. I. June.

Inventor.
George G. Schroeder.
By Glanckler
Att'ys (No Model.) 7 Sheets—Sheet 5.
G. G. SCHROEDER.
TRACTION ENGINE.
No. 582,317. Patented May 11, 1897.
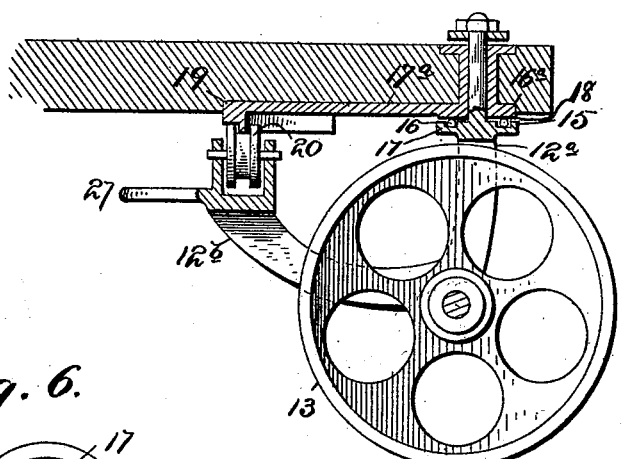
Fig. 5.
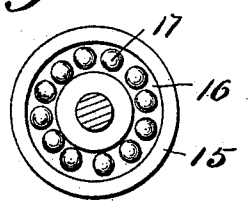
Fig. 6.
Fig. 7.
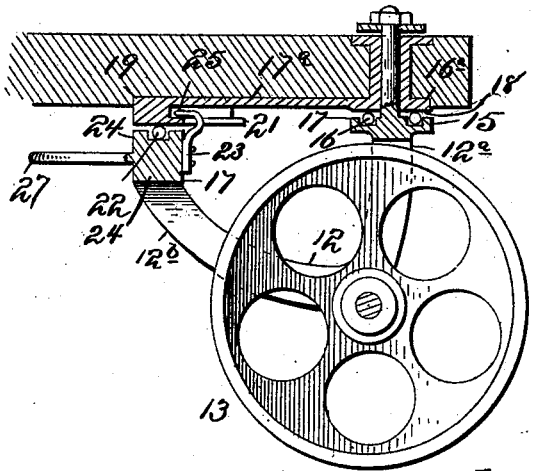
Fig. 8.
Witnesses:
J. B. McGirr.
W. I. June.
Inventor.
George G. Schroeder.
By Hancock &c.
Att'ys

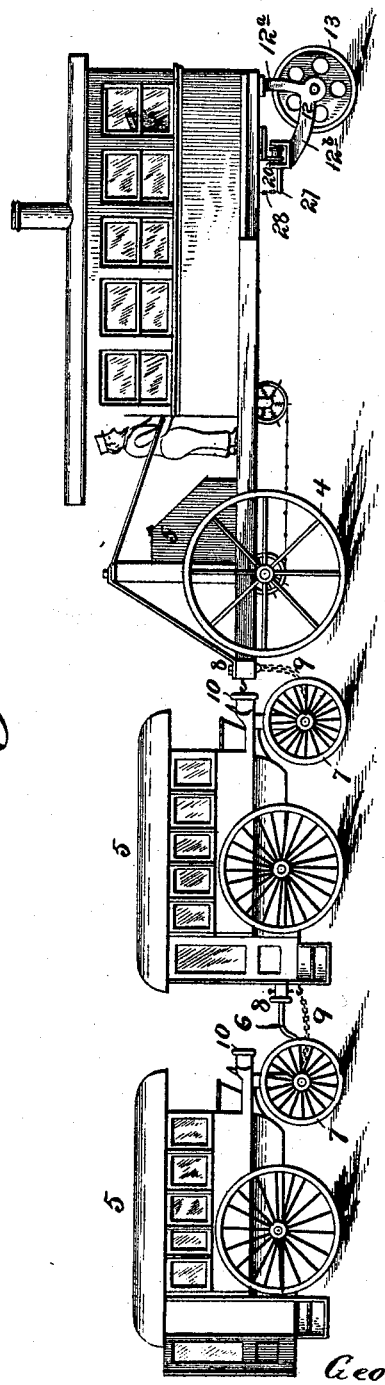

(No Model.) 7 Sheets—Sheet 7.
G. G. SCHROEDER.
TRACTION ENGINE.
No. 582,317. Patented May 11, 1897.
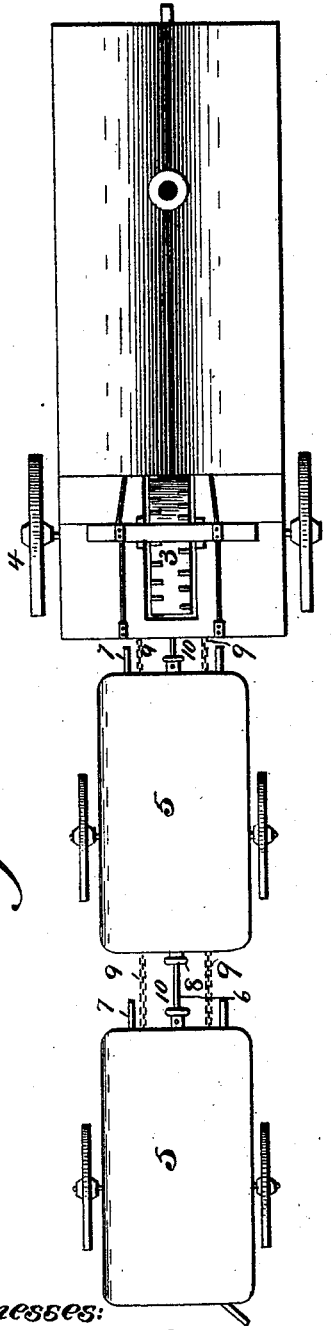
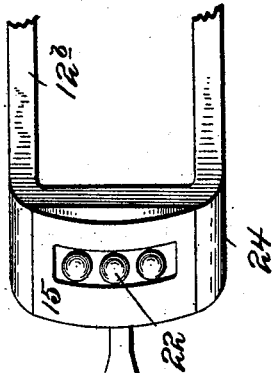
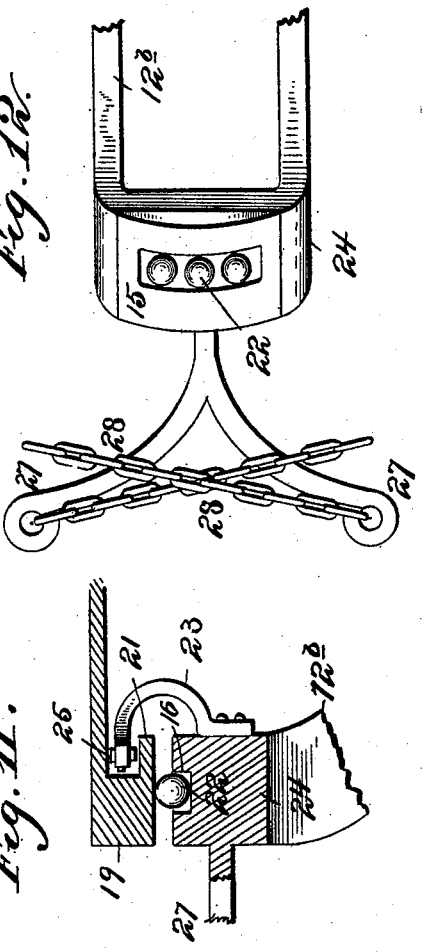
Witnesses:
J. B. McGirr.
W. I. June
Inventor:
George G. Schroeder.
By Harv Clark
Att'ys
THE NORRIS PETERS CO., PHOTO-LITHO., WASHINGTON, D. C.

UNITED STATES PATENT OFFICE.

GEORGE G. SCHROEDER, OF WASHINGTON, DISTRICT OF COLUMBIA.

TRACTION-ENGINE.

SPECIFICATION forming part of Letters Patent No. 582,317, dated May 11, 1897.

Application filed November 11, 1896. Serial No. 611,771. (No model.)

*To all whom it may concern:*

Be it known that I, GEORGE G. SCHROEDER, a citizen of the United States, residing at Washington, in the District of Columbia, have invented certain new and useful Improvements in Traction-Engines; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention consists in certain new and useful improvements in traction-engines, and especially upon the devices described and claimed by me in Letters Patent of the United States No. 447,978, granted to me March 10, 1891.

The object of the invention described herein is to provide a means whereby the engine described therein may be steered from either one of two points, as may be desired, and to provide vehicles adapted to be drawn by such an engine; and for these purposes the invention consists in the construction, arrangement, and combination of the several parts of which it is composed, as will be hereinafter more fully described and claimed.

Figure 1:
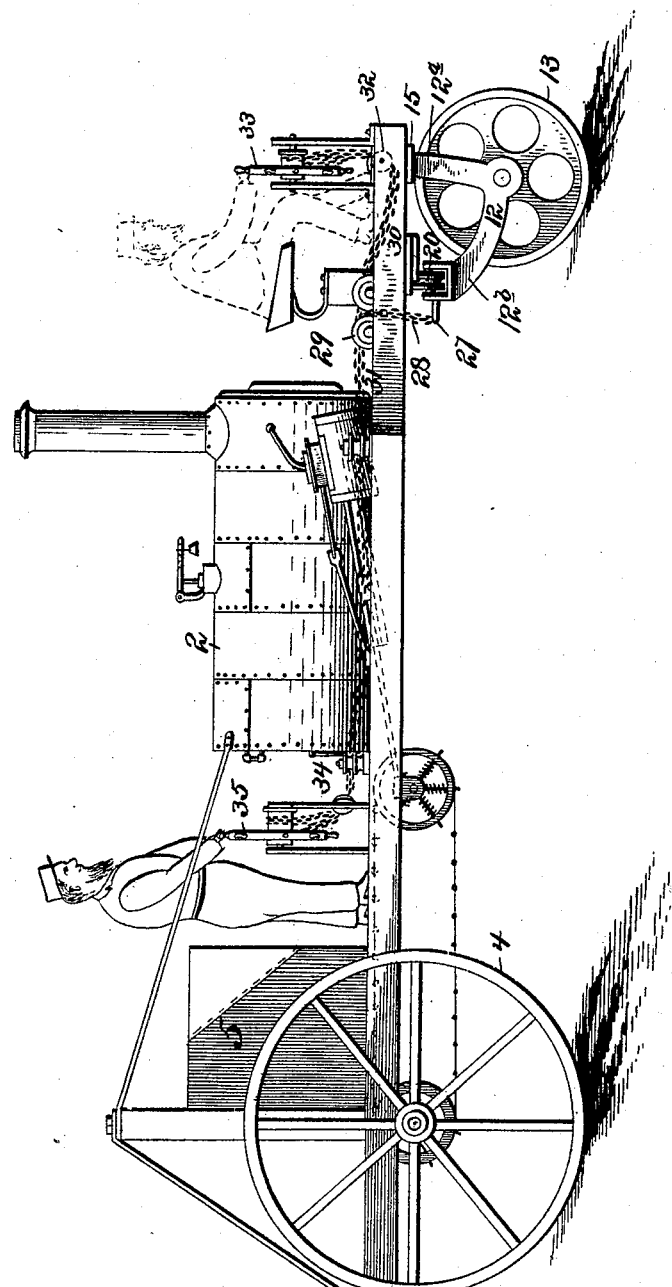
Figure 2:
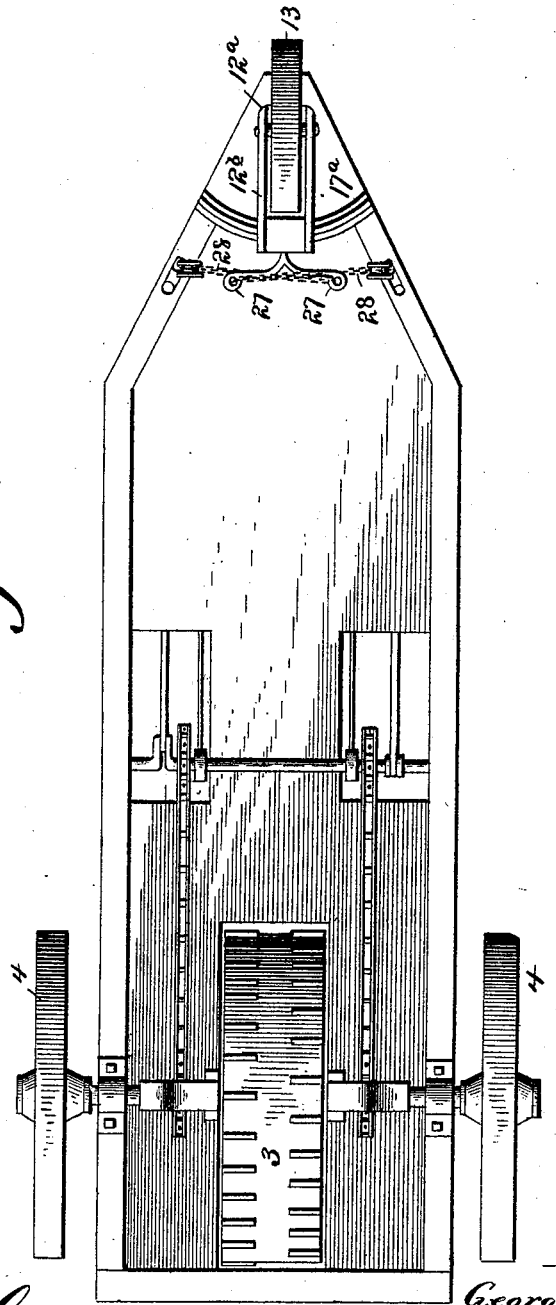
Figure 3:
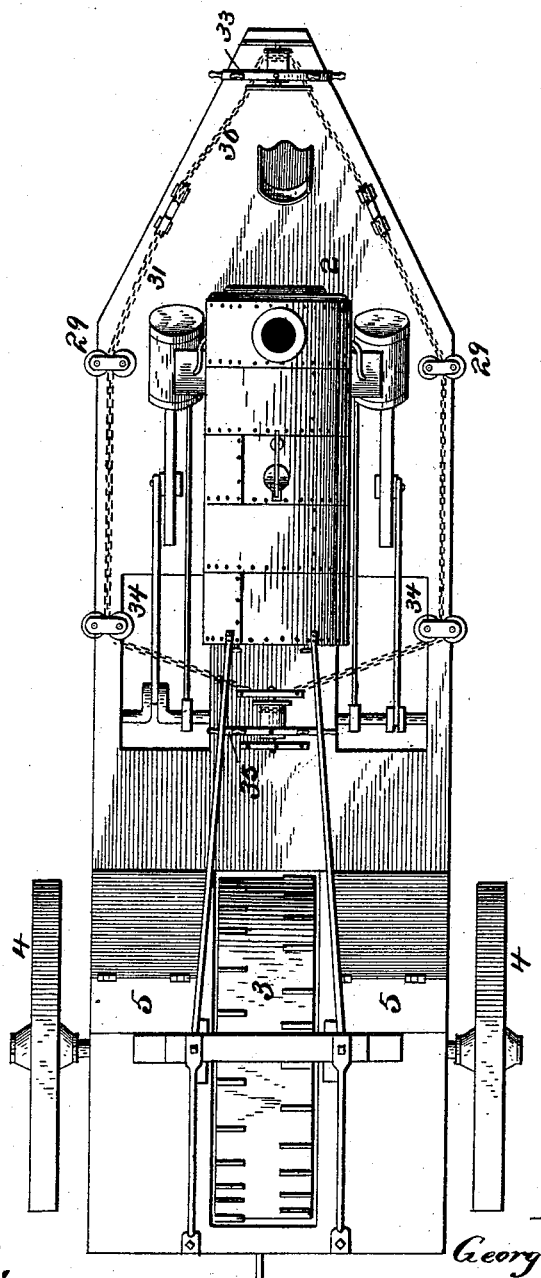
Figure 4:
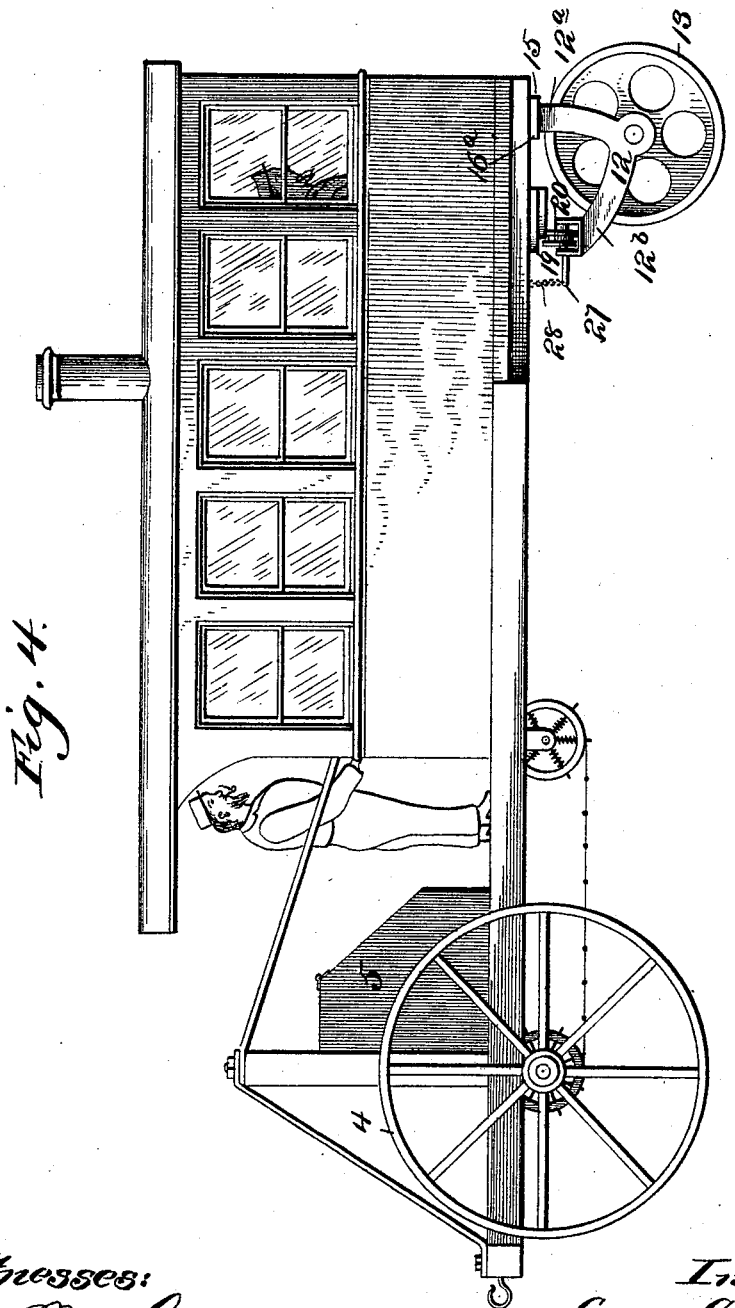

Referring to the accompanying drawings, in which corresponding parts are designated by similar numerals, Figure 1 is a side view of a traction-engine constructed in accordance with my present invention. Figs. 2 and 3 are inverted and top plans thereof. Fig. 4 is a view similar to Fig. 1, a cab being shown upon the engine. Fig. 5 is a detail vertical longitudinal section of the forward portion of the engine shown in the preceding figures. Fig. 6 is a detail view of the annular trough of the steering-frame and of the balls contained therein. Fig. 7 is an inverted plan view of the bed-plate of the steering-frame. Fig. 8 is a modified form of Fig. 5. Figs. 9 and 10 are a side elevation and a plan of an engine such as is shown in Fig. 4 with suitable vehicles secured thereto. Fig. 11 is a detail view showing the mounting of the wheel in the clip of the steering-frame shown in Fig. 8. Fig. 12 is a plan view of the devices shown in Figs. 8 and 11.

The frame is substantially the same as that described in the hereinbefore-mentioned Letters Patent and carries the locomotive-boiler 2, traction-wheel 3, and supporting-wheels 4. These parts and the method of mounting and operating them are the same as is described in said patent and need no further description here further than to state that the engine, if desired, may be provided with a cab covering the boiler, and the propelling and steering gear, as is shown in Figs. 4, 9, and 10, and that coal-bins 5 may be built over the traction-wheel.

The coaches 5, adapted to be used with the said engine, are each provided with four wheels, the forward wheels 7 thereof being of such a diameter as to permit them to pass under the rear corners of the platform of the engine when the latter is turned. The coupling device between the engine and the vehicle or between two adjoining vehicles consists of a coupling-bar 6, permanently secured to the forward axle of each vehicle and adapted to be inserted in and secured to the draw-head 8 on the rear of the succeeding vehicle or engine, and as an additional means of securing the vehicles and engine together I use a coupling-chain 9 between each one thereof. I also provide a bumper 10 on the front of each coach, so that if the coach be immediately following the engine the bumper thereof will be adapted to bear against the draw-head 8 on the latter, thus affording a fulcrum on which the latter draws the former in turning.

The steering-frame 12 consists of two bifurcated arms, the one vertical and the other horizontal, carrying at their elbow the steering-wheel 13. The upper end of the vertical arm $12^a$ of the frame is cylindrical and has formed thereon below such cylindrical portion a flange 15, provided on its upper face with an annular ring or groove 16, in which balls or spherical hardened bodies 17 are contained. The cylindrical portion of the arm $12^a$ passes vertically through a bearing $16^a$, formed on the upper surface of the forward end of a sector-shaped casting or bed-plate $17^a$, the said bearing passing through the forward end of the platform of the engine. A circular table or elevation 18 is formed on the lower surface of the plate around the aperture of the bearing $16^a$ and rests upon the balls 17, contained in the groove 16 in the flange 15, thus permitting the steering-frame to be moved with little friction. The rear end of the bed-plate is arc-shaped, it being struck from a center located in the center of the aperture of the bearing 16ª, and has a downwardly-directed flange 19 thereon, upon which a roller 20, mounted in the rear end of the rearwardly-projecting arm 12ᵇ of the frame, is adapted to bear, as is shown in the hereinbefore-mentioned Letters Patent.

In Fig. 8 a construction is shown which is slightly different from that described above. In this figure the annular flange 19 has a lip 21 projecting forwardly therefrom at its lower edge, and the rear end of the arm 12ᵇ of the frame 12 is thickened or enlarged at 24 and has in its upper surface an arc-shaped trough 21 with closed ends, which contains balls 22, upon which the lower surface of the annular flange 19 rests. A clip 23 is secured to the forward face of the thickened portion 24 of the rear arm 12ᵇ and projects upward therefrom and rearwardly over the lip 21 of the flange, where it carries a wheel 25, which is adapted to bear upon the bed-plate when the weight of the platform comes upon the rear arm of the frame 12, and to bear upon the lip when, on account of the inequalities of the ground, the platform does not bear upon such rear arm. In either of the constructions described above arms 27 project rearwardly and outwardly from the rear end of the rear arm and have their ends connected to the ends of the guide chains or cords 28, which then cross under the platform to the opposite side thereof and pass upward therethrough over grooved rollers 29, the upper ends of the said chain being provided with a suitable coupling whereby they may be connected to either of the chains 30 or 31, the former of which lead forward and around rollers 32 to a windlass 33, mounted on the forward part of the platform, while the latter lead rearward and around rollers 34 to a windlass 35, mounted on the platform in the rear of the boiler, where it is in a position to be operated by the engineer himself. It will thus be seen that the engine may be guided from two distinct and separate places by connecting the proper chains 30 and 31 with the chains 28 and by disconnecting the other chain, and it will also be seen that by crossing the chains 28 in the manner described a greater play of the steering-frame may be caused than would otherwise be the case.

Having thus described my invention, what I claim is—

1. In an engine, the combination with a steering-frame, having rearwardly and outwardly projecting arms thereon, of guide-chains attached to the outer ends of the said arms and passing under the platform of the said engine to the opposite sides thereof, two windlasses mounted at different points on the said platforms, chains passing around the said windlasses and couplings adapted to connect the said guide-chains with either of the said last-named chains, as described.

2. In an engine, the combination with a bed-plate, having an arc-shaped flange with a forwardly-projecting lip upon its rear edge, of a steering-frame, having a vertical and a rearwardly-extending arm, the said vertical arm being pivoted in the platform of the said engine, and the rearwardly-projecting arm having antifriction devices thereon bearing on the same flange and having a clip projecting above and over the said lip, as described.

3. In an engine, the combination with the bed-plate, having a bearing projecting from the upper face of its forward end, and having on its lower face a flange and a table concentric to the said bearing, the said flange having a lip projecting forwardly from its lower surface, of a steering-frame, consisting of two bifurcated arms, carrying therein a steering-wheel, one of the said arms having a cylindrical upper portion contained within the same said bearing and a flange surrounding it below the said cylindrical portion, provided with an annular trough on its upper face, the other arm having an enlargement on its rear end provided with a trough in its upper face, a clip secured to the said enlargement and projecting and carrying a roller above and over the said lip, and balls contained in the said troughs, as described.

4. In combination with a traction-engine, having a draw-head on its rear end, of a vehicle having forward wheels of such a diameter as to pass under the said engine, a coupling-bar secured to the axle of the said vehicle and adapted to be inserted in the draw-head on the said engine, and a buffer on the forward end of the said vehicle, adapted in conjunction with the draw-head on the said engine to form a fulcrum for the said vehicle in turning, as described.

In testimony whereof I affix my signature in presence of two witnesses.

GEORGE G. SCHROEDER.

Witnesses:
 E. E. RAMEY,
 W. I. TUNE.